(12) United States Patent
Kudo (10) Patent No.: US 8,955,993 B2
(45) Date of Patent: Feb. 17, 2015

(54) MIRROR DEVICE FOR VEHICLE

(71) Applicant: Kabushiki Kaisha Tokai-Rika-Denki-Seisakusho, Aichi-ken (JP)

(72) Inventor: Nobuhiro Kudo, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 272 days.

(21) Appl. No.: 13/656,902

(22) Filed: Oct. 22, 2012

(65) Prior Publication Data

US 2013/0107383 A1   May 2, 2013

(30) Foreign Application Priority Data

Oct. 27, 2011   (JP) .................................. 2011-236291

(51) Int. Cl.
G02B 5/08 (2006.01)
B60R 13/07 (2006.01)
B60R 1/074 (2006.01)

(52) U.S. Cl.
CPC ................. B60R 13/07 (2013.01); B60R 1/074 (2013.01)
USPC ........................................................ 359/841

(58) Field of Classification Search
CPC .......... B60R 1/07; B60R 1/072; B60R 1/074; B60R 1/06; B60R 1/068
USPC .................. 359/841, 872, 874, 877
See application file for complete search history.

(56) References Cited

U.S. PATENT DOCUMENTS

| 6,811,270 B2 | 11/2004 | Yoshida |
| 7,303,295 B1 * | 12/2007 | Press ............................ 359/841 |

FOREIGN PATENT DOCUMENTS

| CN | 1274535 | 9/2006 |
| JP | 07-285380 | 10/1995 |
| JP | 2002274261 | 9/2002 |
| JP | 2008143357 | 6/2008 |
| JP | 2011-5915 | 1/2011 |

OTHER PUBLICATIONS

Japanese Office Action JP Application 2011-236291 mailed Jul. 1, 2014 and English translation of notice of reasons for rejection.
Chinese Office Action dated Aug. 1, 2014 and its English translation.

\* cited by examiner

*Primary Examiner* — Euncha Cherry
(74) *Attorney, Agent, or Firm* — Roberts Mlotkowski Safran & Cole P.C.

(57) ABSTRACT

In a door mirror device, a drain wall is disposed on a peripheral edge portion of an open hole in a cover. A first inclined surface is arranged to be separated from and below the drain wall. In a case where liquid entering into the mirror device flows into the open hole in the cover, the liquid travels along the drain wall and flows downward. Then, the liquid reaches a distal end of the drain wall and falls from the distal end of the drain wall onto the first inclined surface. The liquid that has fallen onto the first inclined surface travels along the first inclined surface and flows out to a communication hole. Due to this, the liquid is discharged to below a stand via the communication hole, pooling of the liquid between a cover and a motor base above a support shaft can be suppressed.

12 Claims, 6 Drawing Sheets

MIRROR DEVICE FOR VEHICLE

CROSS-REFERENCE TO RELATED APPLICATION

This application claims priority under 35 USC 119 from Japanese Patent Application No. 2011-236291 filed Oct. 27, 2011, the disclosure of which is incorporated by reference herein.

BACKGROUND OF THE INVENTION

1. Field of the Invention

The present invention relates to a mirror device for a vehicle in which an outer mirror of a vehicle is rotated by the driving of a motor.

2. Related Art

The mirror device for a vehicle of Japanese Patent Application Laid-Open (JP-A) No. 2011-5915 is configured in such a way that an outer mirror is rotated by the driving of a motor of a storage mechanism. Further, the storage mechanism is configured to include a stand (support member), a case and cover (rotating body), and a motor base (holding member). Additionally, the case is rotatably supported on a support shaft of the stand, and the motor base is accommodated inside the case. The motor base holds the motor, and in this state the case is closed off by the cover.

Here, in this mirror device for a vehicle, generally the support shaft is formed in the shape of a substantial cylinder, and a harness (cord) for supplying power to the motor and so forth is wired inside the support shaft. For this reason, holes that are in communication with the inside of the support shaft are formed in the motor base and in the cover above the support shaft.

Moreover, around the holes, tubular ribs are disposed upright on the cover and on the motor base, and the ribs are fitted together. Due to this, for example, liquid that has entered into the mirror device for a vehicle is suppressed by the ribs from entering into the cover and the case.

However, in the above-described mirror device for a vehicle, supposing that the liquid has entered between the motor base and the distal end of the rib of the cover, there is the potential for the liquid to pool between them.

SUMMARY OF THE INVENTION

In consideration of the above-described circumstances, it is an object of the present invention to provide a mirror device for a vehicle that can control the pooling of liquid between a rotating body and a holding member above a support shaft.

A mirror device for a vehicle pertaining to a first aspect of the invention includes: a support member that is configured to include a support shaft formed in a shape of a tube having an insertion hole thereinside, and that is coupled to a vehicle body; a rotating body that is rotatably supported at the support shaft, that is configured to be integrally rotatable with an outer mirror of the vehicle by driving of a motor, and in which an open hole is provided above the insertion hole; a holding member that is accommodated inside the rotating body together with the motor in a state in which the holding member holds the motor; a guide portion that is provided at a peripheral edge of the open hole in the rotating body and that guides downward liquid that ingresses into the open hole; and a discharge portion that is provided at the holding member, that is disposed so as to be separated from and below the guide portion, and that causes the liquid which is guided downward by the guide portion to be discharged to the insertion hole.

In the mirror device for a vehicle pertaining to the first aspect, the support member is coupled to the vehicle body. The support member is configured to include the tubular support shaft, and the insertion hole is formed in the support shaft. Further, the rotating body is rotatably supported on the support shaft, and the open hole is disposed in the rotating body above the insertion hole. Moreover, the holding member and the motor that is held in the holding member are accommodated inside the rotating body.

Here, the guide portion is disposed on the peripheral edge of the open hole in the rotating body, and the guide portion downwardly guides the liquid that has ingressed into the open hole. Further, the discharge portion is disposed on the holding member, and the discharge portion is arranged in such a way as to be spaced apart (separated) from and below the guide portion and causes the liquid that has been downwardly guided by the guide portion to be discharged to the insertion hole.

Due to this, for example, in a case where liquid such as water has ingressed into the mirror device for a vehicle and the liquid ingresses (flows) into the open hole in the rotating body, the liquid flows downward by the guide portion. Then, the liquid falls from the guide portion onto the discharge portion and flows out to the insertion hole by the discharge portion. Due to this, the liquid is discharged to below the support member via the insertion hole.

A mirror device for a vehicle pertaining to a second aspect of the invention is the mirror device for a vehicle pertaining to the first aspect wherein: an upper end cover portion is provided at the holding member, the upper end portion covering an upper end portion of the support shaft, and a communication hole that is in communication with the insertion hole being formed in the upper end cover portion; the guide portion is formed in a shape of a tube along the peripheral edge of the open hole and projects downward from the rotating body; and the discharge portion is provided at an upper edge portion of the communication hole in the upper end cover portion and is disposed such that the discharge portion is inclined inward in a radial direction of the communication hole as the discharge portion heads (goes) downward.

In the mirror device for a vehicle pertaining to the second aspect, the guide portion is formed in the shape of the tube along the peripheral edge of the open hole and projects downward from the rotating body. Due to this, in a case where the liquid ingresses (flows) into the open hole, the liquid flows down along the direction in which the guide portion projects, so the liquid can be reliably caused to flow downward.

Further, the upper end cover portion is disposed on the holding member, and the upper end cover portion covers the upper end portion of the support shaft. The communication hole that is in communication with the insertion hole is formed in the upper end cover portion. Additionally, the discharge portion is disposed on the upper edge portion of the communication hole, and the discharge portion is arranged in such a way as to be inclined inward in the radial direction of the communication hole as it heads downward. Due to this, by disposing the discharge portion in such a way as to be inclined on the upper edge portion of the upper end cover portion, the liquid can be easily discharged to the communication hole.

A mirror device for a vehicle pertaining to a third aspect of the invention is the mirror device for a vehicle pertaining to the second aspect, wherein an outer peripheral surface of the guide portion is disposed such that the outer peripheral surface is inclined inward in a radial direction of the open hole as the outer peripheral surface heads (goes) downward.

In the mirror device for a vehicle pertaining to the third aspect, the outer peripheral surface of the guide portion is arranged in such a way as to be inclined inward in the radial direction of the open hole as it heads downward, so when the liquid that has traveled along the guide portion and flowed downward has reached the distal end of the guide portion, the liquid is suppressed from ingressing to the outer peripheral surface side of the guide portion. Further, supposing that the liquid has ingressed to the outer peripheral surface side of the guide portion and adhered to the outer peripheral surface of the guide portion, the adherent liquid travels along the outer peripheral surface of the guide portion, flows down to the distal end of the guide portion, and falls toward the discharge portion.

A mirror device for a vehicle pertaining to a fourth aspect of the invention is the mirror device for a vehicle pertaining to the second aspect or the third aspect, wherein: an outer tube portion is provided in a shape of a tube at the rotating body, the outer tube portion projecting downward from the rotating body at an outer side of the guide portion in a radial direction of the open hole, and being disposed above the upper end cover portion; and the discharge portion is disposed below a distal end of the outer tube portion.

In the mirror device for a vehicle pertaining to the fourth aspect, the tubular outer tube portion is disposed on the rotating body. The outer tube portion projects downward from the rotating body on the outside of the guide portion in the radial direction of the open hole and is arranged above the upper end cover portion. Due to this, supposing that the liquid that has traveled along the guide portion and reached the distal end of the guide portion has ingressed to the radial direction outside of the guide portion, the liquid is blocked by the outer tube portion and falls onto the upper end cover portion.

Here, the discharge portion is arranged below the distal end of the outer tube portion. For this reason, the liquid that has fallen onto the upper end cover portion is discharged from the discharge portion to the communication hole, whereby the distal end of the outer tube portion is suppressed from being immersed in the liquid that has fallen onto the upper end cover portion. Due to this, the liquid that has fallen onto the upper end cover portion can be suppressed from traveling back to the outer tube portion again.

A mirror device for a vehicle pertaining to a fifth aspect of the invention is the mirror device for a vehicle pertaining to the fourth aspect, wherein a fitted tube portion is provided in a shape of a tube at the upper end cover portion, the fitted tube portion projecting upward from the upper end cover portion at an outer side of the outer tube portion in a radial direction of the outer tube portion, and being fitted with an outer peripheral portion of the outer tube portion.

In the mirror device for a vehicle pertaining to the fifth aspect, the tubular fitted tube portion is disposed on the upper end cover portion, and the fitted tube portion projects upward from the upper end cover portion on the outside of the outer tube portion in the radial direction of the outer tube portion. Further, the fitted tube portion is fitted with the outer peripheral portion of the outer tube portion.

Due to this, supposing that the liquid has ingressed to the radial direction outside of the guide portion from between the guide portion and the discharge portion, the ingress of the liquid into the rotating body is suppressed by the outer tube portion and the fitted tube portion.

A mirror device for a vehicle pertaining to a sixth aspect of the invention is the mirror device for a vehicle pertaining to any one of the second aspect to the fifth aspect, wherein a distal end portion of the guide portion is bent such that a distal end portion of the guide portion is inclined inward in a radial direction of the open hole as the distal end portion of the guide portion heads (goes) downward.

In the mirror device for a vehicle pertaining to the sixth aspect, the distal end portion of the guide portion is bent in such a way as to be inclined inward in the radial direction of the open hole as it heads downward, so as seen in a plan view, the distal end of the guide portion can be arranged inside the communication hole in the radial direction of the communication hole. Due to this, the liquid that has traveled along the guide portion and flowed down to the distal end of the guide portion can be directly discharged to the communication hole and the insertion hole.

A mirror device for a vehicle pertaining to a seventh aspect of the invention is the mirror device for a vehicle pertaining to any one of the second aspect to the sixth aspect, wherein an ingress prevention tube portion is provided in a shape of a tube at the rotating body, the ingress prevention tube portion projecting upward from the peripheral edge of the open hole.

In the mirror device for a vehicle pertaining to the seventh aspect, the ingress preventing tube portion is disposed on the rotating body. The ingress preventing tube portion is disposed in the shape of the tube and projects upward from the peripheral edge portion of the open hole. For this reason, the ingress, into the open hole, of the liquid that has ingressed into the mirror device for a vehicle is suppressed by the ingress preventing tube portion.

A mirror device for a vehicle pertaining to an eighth aspect of the invention is the mirror device for a vehicle pertaining to any one of the first aspect to the seventh aspect, wherein a gap is formed between the guide portion and the discharge portion such that a capillary phenomenon does not occur.

In the mirror device for a vehicle pertaining to the eighth aspect, the gap such that capillary phenomenon does not occur is disposed between the guide portion and the discharge portion, so the liquid can be suppressed even more from pooling between the guide portion and the discharge portion.

It is possible in the second aspect (the fourth aspect) that a groove portion is formed at the upper end cover portion, the groove portion being disposed at an outer side of the discharge portion in the radial direction of the communication hole (and directly below the outer tube portion).

According to the mirror device for a vehicle pertaining to the first aspect, pooling of the liquid between the rotating body and the holding member above the support shaft can be suppressed.

According to the mirror device for a vehicle pertaining to the second aspect, the liquid that has ingressed into the open hole can be reliably guided downward, and the liquid can be discharged to the insertion hole by a simple configuration.

According to the mirror device for a vehicle pertaining to the third aspect, the liquid that has traveled on the guide portion can be reliably caused to fall onto the discharge portion.

According to the mirror device for a vehicle pertaining to the fourth aspect, the liquid that has fallen to the upper end cover portion can be suppressed from traveling back to the outer tube portion.

According to the mirror device for a vehicle pertaining to the fifth aspect, the ingress of the liquid into the rotating body can be suppressed by the outer tube portion and the fitted tube portion.

According to the mirror device for a vehicle pertaining to the sixth aspect, the liquid that has ingressed from the open hole can be effectively discharged to the insertion hole.

According to the mirror device for a vehicle pertaining to the seventh aspect, the ingress, into the open hole, of the liquid that has ingressed into the mirror device for a vehicle can be suppressed.

According to the mirror device for a vehicle pertaining to the eighth aspect, the liquid can be suppressed even more from pooling between the distal end of the guide portion and the discharge portion.

BRIEF DESCRIPTION OF THE DRAWINGS

Embodiments of the invention will be described in detail with reference to the following figures, wherein.

DETAILED DESCRIPTION OF THE INVENTION

First Embodiment

Figure 2:
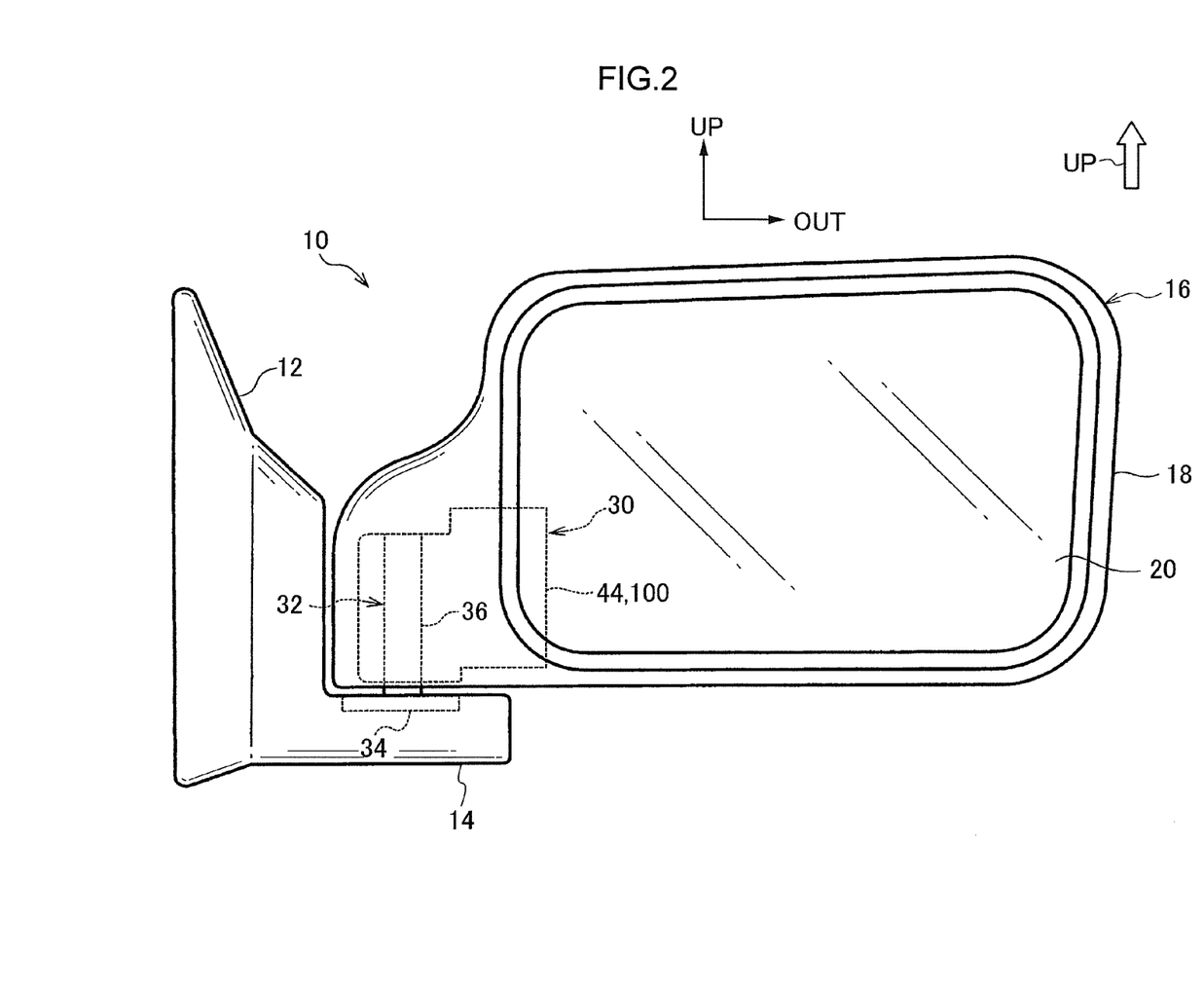
FIG. 2 is a front view showing the door mirror device for a vehicle pertaining to the first embodiment of the invention as seen from a vehicle rear direction.

In FIG. 2, a door mirror device for a vehicle 10 pertaining to a first embodiment is shown in a front view as seen from a vehicle rear direction. Arrow FR appropriately shown in the drawings represents a vehicle front direction, arrow OUT represents a vehicle width direction outside (vehicle right side), and arrow UP represents up. Further, the door mirror device for a vehicle 10 is installed on a door (not shown in the drawings) of a vehicle and is arranged on the vehicle width direction outside of the vehicle.

As shown in FIG. 2, the door mirror device for a vehicle 10 is configured to include a stay 12 and a door mirror body 16.

The stay 12 is arranged on the vehicle width direction outside of the door of the vehicle, and the vehicle width direction inside section of the stay 12 is fixed to the door (vehicle body) of the vehicle. A fixing portion 14 for fixing a later-described storage mechanism 30 is disposed on the vehicle width direction outside section of the stay 12.

The door mirror body 16 is configured to include a visor 18, an outer mirror 20, and the storage mechanism 30. The door mirror body 16 is disposed above the fixing portion 14 of the stay 12 via the later-described storage mechanism 30. The visor 18 is formed in the shape of a substantial cuboid container, and the vehicle rear surface of the visor 18 is open. The outer mirror 20 is disposed in the open section of the visor 18, and the entire peripheral portion and the vehicle front surface of the outer mirror 20 are covered by the visor 18. Further, the outer mirror 20 is arranged with the mirror surface of the outer mirror 20 directing toward the vehicle rear, so that the outer mirror 20 makes it possible for an occupant to see the vehicle rear direction.

The visor 18 and the outer mirror 20 are coupled to a later-described rotating body 43 (a case 44 and a cover 100) of the storage mechanism 30. Due to the storage mechanism 30, the visor 18 and the outer mirror 20 are configured to be rotatable between a use position shown in FIG. 2 and a storage position in which the outer mirror 20 is arranged substantially facing the door of the vehicle.

Figure 3:
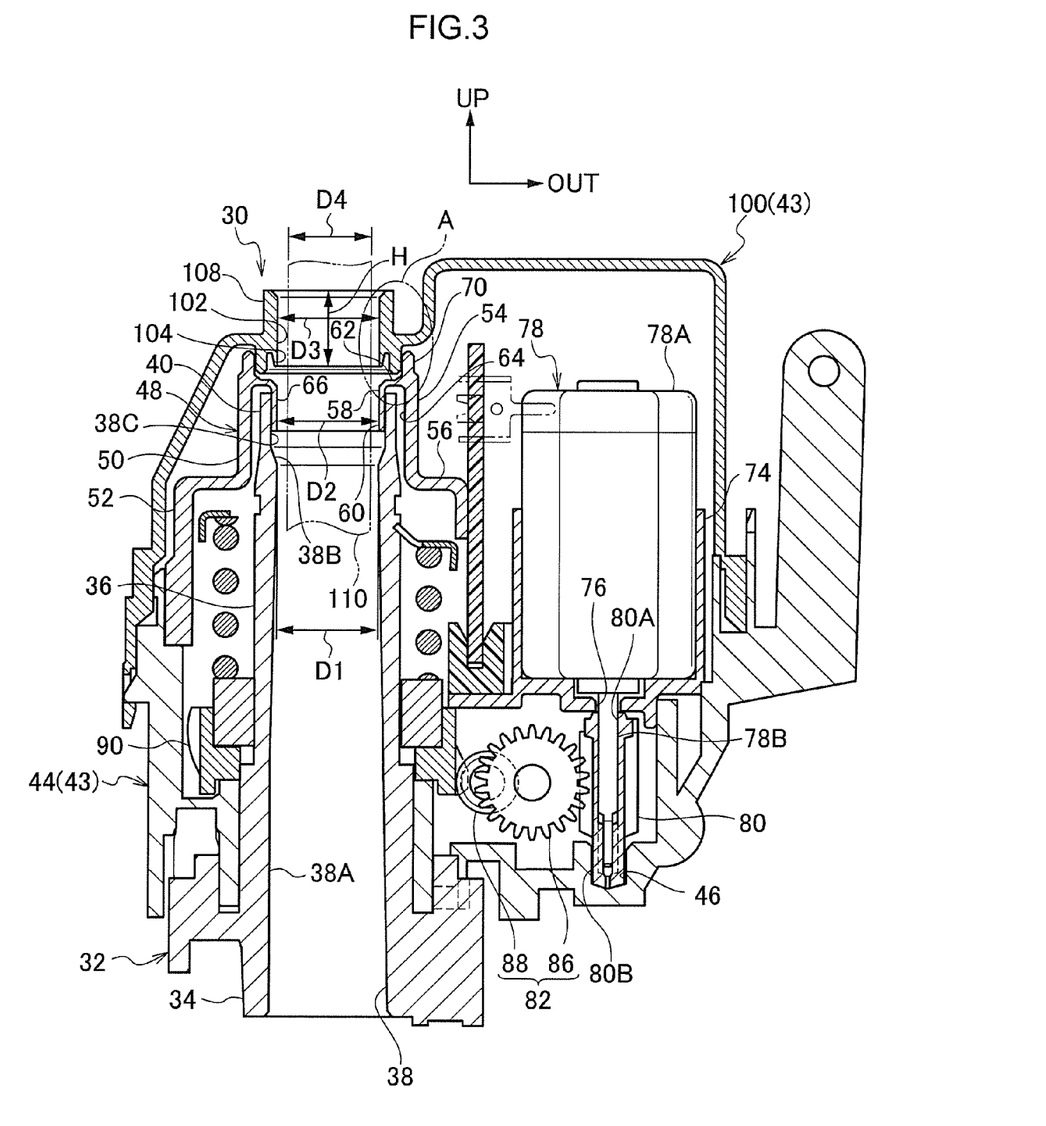
FIG. 3 is a longitudinal sectional view showing the entire storage mechanism shown in FIG. 1.

Next, the configuration of the storage mechanism 30, which is the main portion of the present invention, will be described. As shown in FIG. 3, the storage mechanism 30 has a stand 32 that serves as a support member, a motor base 48 that serves as a holding member, and the rotating body 43. Further, the rotating body 43 is configured to include the case 44 and the cover 100.

The stand 32 configures the vehicle width direction inside section of the storage mechanism 30. A fixed portion 34 is disposed on the lower end portion of the stand 32, and the fixed portion 34 is fixed inside the fixing portion 14 of the stay 12. Due to this, the stand 32 is coupled to the door (vehicle body) of the vehicle via the stay 12. Further, a substantially cylindrical support shaft 36 is disposed in the stand 32 above the fixed portion 34, and the support shaft 36 projects upward from the fixed portion 34.

A cross-sectionally circular insertion hole (through hole) 38 is formed in, so as to penetrate, the support shaft 36 along its axial center. The insertion hole 38 has a lower insertion hole portion 38A that configures the lower section of the insertion hole 38, an upper insertion hole portion 38C that configures the upper end portion of the insertion hole 38, and a middle insertion hole portion 38B that is arranged between the lower insertion hole portion 38A and the upper insertion hole portion 38B.

The diameter of the lower insertion hole portion 38A is set in such a way as to become gradually smaller as it heads upward from the lower end thereof. At the upper end of the lower insertion hole portion 38A, the diameter dimension of the insertion hole 38 is a smallest diameter dimension D1. Further, the upper insertion hole portion 38C is disposed extending along the up-and-down direction, and the diameter dimension of the upper insertion hole portion 38C is set larger in comparison to the smallest diameter dimension D1. Here, the upper end of the support shaft 36 is a support portion 40. Further, the diameter of the middle insertion hole portion 38B is set in such a way as to become gradually smaller as it heads downward from the upper end thereof. The middle insertion hole portion 38B couples the lower insertion hole portion 38A and the upper insertion hole portion 38C.

The case 44 configures the lower portion of the storage mechanism 30. The case 44 is formed in the shape of a substantial rectangular parallelopiped container, and the upper surface of the case 44 is open. The support shaft 36 of the stand 32 is inserted from below into the vehicle width direction inside section of the case 44, and the case 44 is rotatably supported on the support shaft 36. A cylindrical pivot support hole 46 is formed in the vehicle width direction outside section of the lower wall of the case 44, and the pivot support hole 46 is open upward.

The motor base 48 is disposed inside the case 44. The motor base 48 is made of resin (e.g., POM (polyacetal)) and is fitted (press-fitted) into the upper end of the case 44 in a state in which the motor base 48 covers the upper surface of the case 44.

A cover portion 50 is integrally disposed on the vehicle width direction inside section of the motor base 48. The cover portion 50 is formed in the shape of a substantial cylinder along the up-and-down direction, is arranged coaxially with the support shaft 36, and covers the outer peripheral portion of the support shaft 36. The cover portion 50 has a lower cover portion 52 that configures the lower section of the cover portion 50 and an upper cover portion 54 that configures the upper section of the cover portion 50. The diameter dimension of the upper cover portion 54 is set smaller in comparison to the diameter dimension of the lower cover portion 52, and the lower end portion of the upper cover portion 54 and the upper end portion of the lower cover portion 52 are coupled together by a coupling portion 56.

Figure 1:
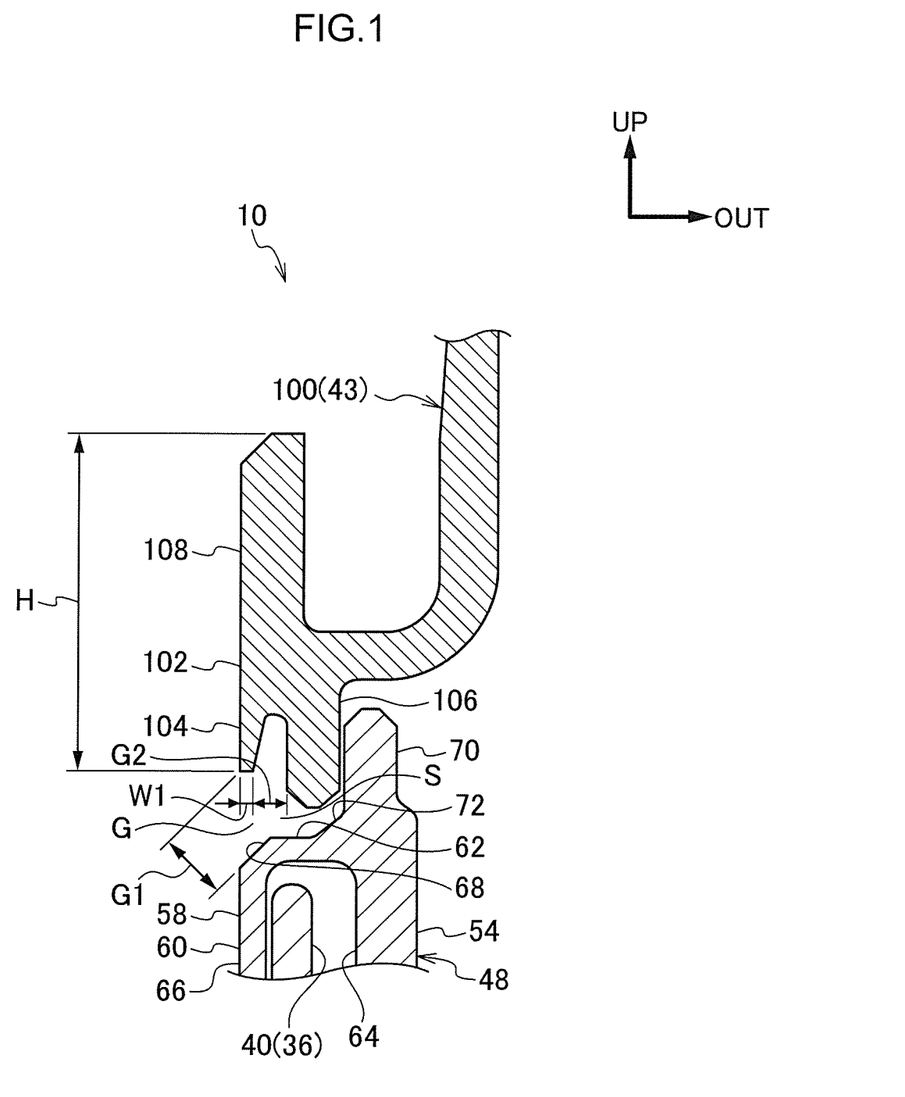
FIG. 1 is an enlarged longitudinal sectional view showing part of a storage mechanism used in a door mirror device for a vehicle pertaining to a first embodiment of the invention (an enlarged view of portion A in FIG. 3)

An upper end cover portion 58 is disposed on the entire periphery of the upper end of the upper cover portion 54, and the upper end cover portion 58 is formed in the shape of a substantial crank in cross section. As shown in FIG. 1, the upper end cover portion 58 is configured to include a side wall 60, an upper wall 62, and a fitted wall 70 that serves as a fitted tube portion.

The side wall 60 is formed in the shape of a cylinder, is disposed on the inside of the upper cover portion 54 in the radial direction of the upper cover portion 54, and is arranged coaxially with the support shaft 36. Further, the upper wall 62 is arranged in a direction orthogonal to the up-and-down direction and couples together the upper end of the side wall 60 and the upper end of the upper cover portion 54. Due to this, a groove portion 64 is disposed between the side wall 60 and the upper wall 62 and the upper cover portion 54. The groove portion 64 is formed in an annular shape, is arranged coaxially with the support shaft 36, and is open downward. The support portion 40 (upper end portion) of the support shaft 36 is inserted inside the groove portion 64, and the upper end cover portion 58 is rotatably supported on the support portion 40. Due to this, the support portion 40 is covered by the upper end cover portion 58.

Further, the axial center section of the side wall 60 is a communication hole (through hole) 66, and the communication hole 66 is in communication with the insertion hole 38 (the lower insertion hole portion 38A and the middle insertion hole portion 38B) in the support shaft 36. Further, a diameter dimension D2 of the communication hole 66 is set to the same dimension as the smallest diameter dimension D1 of the insertion hole 38 (see FIG. 3). The diameter dimension D2 of the communication hole 66 may set to a larger diameter in comparison to the smallest diameter dimension D1 of the insertion hole 38. That is, the inner peripheral surface of the side wall 60 may be arranged on the outside, with respect to the upper end of the lower insertion hole portion 38A, in the radial direction of the support shaft 36 in a plane view (as seen from the above).

A first inclined surface 68 that serves as a discharge portion is disposed on the upper end cover portion 58 on the entire periphery of the upper edge portion of the communication hole 66. The first inclined surface 68 is arranged in such a way as to be inclined inward in the radial direction of the communication hole 66 as it heads downward. The cross section of the first inclined surface 68 may be formed in the shape of an arc.

The fitted wall 70 is disposed above side the upper cover portion 54. The fitted wall 70 is formed in the shape of a substantial cylinder and projects upward from the upper wall 62. A second inclined surface 72 is formed on the boundary section between the upper wall 62 and the fitted wall 70. The second inclined surface 72 is arranged in such a way as to be inclined inward in the radial direction of the fitted wall 70 as it heads downward.

As shown in FIG. 3, a substantially rectangular tube-shaped fixing tube 74 is integrally disposed on the vehicle width direction outside section of the motor base 48. The fixing tube 74 projects upward from the motor base 48. Further, a circular through hole (penetrate hole) 76 is formed in the motor base 48 in the center of the inside of the fixing tube 74. The through hole 76 is arranged coaxially with the pivot support hole 46 in the case 44.

A motor 78 is fixed (held) inside the fixing tube 74. The motor 78 is configured to include a substantially rectangular tube-shaped body portion 78A and an output shaft 78B (shaft) that projects downward from the body portion 78A. By that the motor 78 is driven, the output shaft 78B rotates. The output shaft 78B penetrates the through hole 76 in the motor base 48 and is inserted inside the case 44. A gap is formed between the entire periphery of the output shaft 78B and the through hole 76, and the output shaft 78B is not pivotally supported in the motor base 48.

A worm gear 80 is disposed on the output shaft 78B. The worm gear 80 is made of resin and is formed in the shape of a substantial cylinder. An insertion hole 80A is formed in the worm gear 80 along its axial center, and the output shaft 78B is inserted from above into the insertion hole 80A. Due to this, the worm gear 80 is configured to be integrally rotatable with the output shaft 78B when the output shaft 78B rotates.

The upper end of the worm gear 80 is in contact with the motor base 48. Due to this, the upward movement of the worm gear 80 is restricted (stopped) by the motor base 48. The output shaft 78B is not inserted as far as the lower end of the insertion hole 80A and is given a configuration in which the upward movement (toward the body portion 78B side) of the worm gear 80 with respect to the output shaft 78B is allowed between the output shaft 78B and the worm gear 80.

A cylindrical pivot support portion 80B is formed on the lower portion of the worm gear 80. The pivot support portion 80B is fitted into the pivot support hole 46 in the case 44. Due to this, the pivot support portion 80B is pivotally supported in such a way that it freely rotates in the pivot support hole 46, and the downward movement of the worm gear 80 is restricted (stopped) by the lower wall of the case 44.

The lower portion of the insertion hole 80A is formed inside the pivot support portion 80B, and the lower portion of the output shaft 78B is inserted inside the pivot support portion 80B. The position at which the pivot support portion 80B is pivotally supported by the pivot support hole 46 and the position at which the lower portion of the output shaft 78B is inserted into the lower portion of the insertion hole 80A coincide (lap or lie on top of each other) in the axial direction (up-and-down direction) of the worm gear 80 and the output shaft 78B. Due to this, the lower portion of the output shaft 78B is pivotally supported in such a way that it freely rotates in the case 44 (the pivot support hole 46) via the pivot support portion 80B of the worm gear 80.

Figure 4:
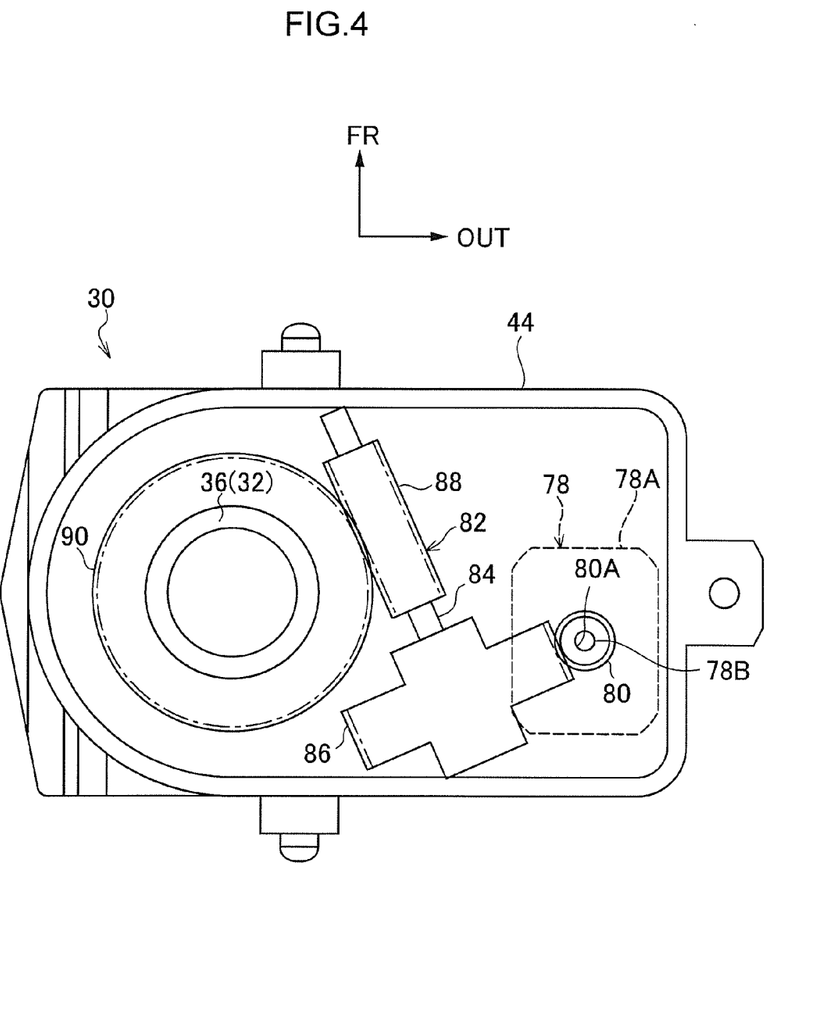
FIG. 4 is a plan view showing main portions of the storage mechanism shown in FIG. 3 as seen from a vehicle up direction.

Further, as shown in FIG. 4, a worm shaft 82 is disposed inside the case 44. A gear shaft 84 that is made of metal and has the shape of a circular shaft is disposed in the worm gear 82, and the gear shaft 84 is pivotally supported at both ends in such a way that it may freely rotate inside the case 44. A helical gear portion 86 (worm wheel gear) made of resin is fixed to one end side section of the gear shaft 84, and a worm gear portion 88 made of resin is fixed to the other end side section of the gear shaft 84. The helical gear portion 86 is meshed with the axial direction middle portion of the worm gear 80, and when the worm gear 80 is rotated, the helical gear portion 86, the gear shaft 84, and the worm gear portion 88 are integrally rotated so that the worm shaft 82 is rotated.

Moreover, a gear plate 90 made of metal is disposed inside the case 44. The support shaft 36 of the stand 32 is passed through the gear plate 90, and the gear plate 90 is arranged coaxially with the support shaft 36 and is held in such a way as to be incapable of rotating with respect to the support shaft 36. The worm gear portion 88 is meshed with the gear plate 90, and when the worm gear portion 88 rotates, the worm gear portion 88 rotates about the gear plate 90. Due to this, the case 44 and the motor base 48 of the storage mechanism 30 are configured to be rotatable about the support shaft 36 integrally with the worm gear portion 88.

As shown in FIG. 3, the cover 100 configures the upper portion of the storage mechanism 30. The cover 100 is made of resin (e.g., PP (polypropylene)) and is formed in the shape of a substantial container. The undersurface of the cover 100 is open. The lower end of the cover 100 is fixed to the outer periphery of the upper end of the case 44, and the cover 100 closes off the case 44 in a state in which the cover 100 covers the motor 78 and the motor base 48. Due to this, the cover 100 is configured to be rotatable about the support shaft 36 integrally with the case 44. Further, the vehicle width direction inside section of the cover 100 presses the vehicle width direction inside section of the motor base 48 downward. Due to this, the motor base 48 is held between the case 44 and the cover 100.

A circular open hole 102 is formed in, so as to penetrate, the upper wall of the cover 100 above the insertion hole 38 in the support shaft 36 and the communication hole 66 in the motor base 48. The open hole 102 is arranged coaxially with the insertion hole 38 and the communication hole 66, and a diameter dimension D3 of the open hole 102 is set to the same dimension as the diameter dimension D2 of the communication hole 66.

As shown in FIG. 1, a drain wall 104 that serves as a guide portion is disposed on the upper wall of the cover 100 on the peripheral edge portion of the open hole 102. The drain wall 104 is formed in the shape of a cylinder and extends downward from the peripheral edge portion of the open hole 102. The inner peripheral surface of the drain wall 104 is arranged flush with the inner peripheral surface of the open hole 102. Further, the outer peripheral surface of the drain wall 104 is arranged in such a way as to be inclined inward in the radial direction of the open hole 102 as it heads downward, and the lower end of the inner peripheral surface of the drain wall 104 and the lower end of the outer peripheral surface of the drain wall 104 are coupled together by the distal (tip) end surface (lower end surface) of the drain wall 104. The distal end surface of the drain wall 104 is arranged in a direction orthogonal to the up-and-down direction. In consideration of the forming (molding) of the cover 100, a thickness dimension W1 of the drain wall 104 is set to 0.8 mm, for example. Further, the distal end surface of the drain wall 104 is arranged directly above the first inclined surface 68 of the motor base 48. A smallest dimension G1 of a gap G between the distal end surface of the drain wall 104 and the first inclined surface 68 is set to 1 mm.

Further, a fitting wall 106 that serves as an outer tube portion is disposed on the upper wall of the cover 100 on the outside with respect to the drain wall 104 in the radial direction of the open hole 102. The fitting wall 106 is formed in the shape of a cylinder and projects downward from the upper wall of the cover 100. Further, the distal (tip) end portion of the fitting wall 106 is arranged lower than the distal end surface of the drain wall 104. A gap dimension G2 between the fitting wall 106 and the distal end of the drain wall 104 is set to 1 mm.

Moreover, the fitting wall 106 is arranged on the inside of the fitted wall 70 in the radial direction of the fitting wall 106 and above the upper wall 62. The fitting wall 106 is fitted with the fitted wall 70 in a state in which the fitting wall 106 and the fitted wall 70 overlap in the radial direction of the fitting wall 106. Due to this, a space S is formed between the cover 100 and the motor base 48.

Moreover, an ingress (entering) preventing wall 108 that serves as an ingress preventing tube portion is disposed on the upper wall of the cover 100 on the peripheral edge portion of the open hole 102. The ingress preventing wall 108 is formed in the shape of a cylinder and projects upward from the peripheral edge portion of the open hole 102. The inner peripheral surface of the ingress preventing wall 108 is arranged flush with the inner peripheral surface of the open hole 102.

Moreover, as shown in FIG. 3, a harness 110 (cord) is wired inside the insertion hole 38 in the support shaft 36, inside the communication hole 66 in the motor base 48, and inside the open hole 102 in the cover 100. The harness 110 connects a power supply device (not shown in the drawings) in the vehicle side and a substrate (not shown in the drawings) inside the door mirror device for a vehicle 10. The harness 110 is configured in such a way that power is supplied to the motor 78 by the harness 110. Further, in comparison to the differences between the smallest diameter dimension D1 of the insertion hole 38 and a diameter dimension D4 of the harness 110, between the respective diameter dimensions D2 and D3 of the communication hole 66 and the open hole 102 and the diameter dimension D4 of the harness 110, a dimension H between the upper end (distal end) of the ingress preventing wall 108 and the lower end (distal end) of the drain wall 104 in the up-and-down direction is set larger.

Here, as mentioned above, the visor 18 and the outer mirror 20 are coupled to the rotating body 43 (the case 44 and the cover 100), and the visor 18 and the outer mirror 20 are made rotatable about the support shaft 36 integrally with the rotating body 43 (the case 44 and the cover 100). For this reason, by that the motor 78 is driven and the output shaft 78B rotates in one direction, the visor 18 and the outer mirror 20 are rotated toward the vehicle rear side and inward in the vehicle width direction integrally with the case 44 and the cover 100. Due to this, the visor 18 and the outer mirror 20 are stored in the storage position. On the other hand, by that the motor 78 is driven and the output shaft 78B is rotated in the other direction, the visor 18 and the outer mirror 20 are rotated to the use position integrally with the case 44 and the cover 100.

Next, the operation and effects of the present embodiment will be described.

In the door mirror device 10 of the above configuration, in the storage mechanism 30, when the motor 78 is driven and the output shaft 78B rotates, the worm gear 80 is rotated integrally with the output shaft 78B and the worm shaft 82 is rotated (the helical gear portion 86, the gear shaft 84, and the worm gear portion 88 are integrally rotated). Due to this, the worm gear portion 88 is rotated about the gear plate 90, whereby the case 44 and the cover 100 are rotated about the support shaft 36 integrally with the worm gear portion 88, and the visor 18 and the outer mirror 20 are rotated integrally with the case 44 and the cover 100.

For this reason, when the motor 78 is driven and the output shaft 78B rotates in one direction, the visor 18 and the outer mirror 20 are rotated to the storage position integrally with the case 44 and the cover 100. When the motor 78 is driven and the output shaft 78B is rotated in the other direction, the visor 18 and the outer mirror 20 are rotated to the use position integrally with the case 44.

Incidentally, when liquid such as water has ingressed (entered) into the door mirror device for a vehicle 10 when the vehicle is subjected to a high-pressure car wash, for example, there are cases where the liquid flows (ingresses) into the open hole 102 from above the open hole 102 in the cover 100.

Here, the drain wall 104 is disposed on the peripheral edge portion of the open hole 102 in the cover 100, and the first inclined surface 68 is arranged in such a way as to be spaced apart from and below the drain wall 104.

For this reason, in a case where the liquid that has ingressed into the door mirror device for a vehicle 10 flows (ingresses) into the open hole 102 in the cover 100, the liquid travels along the drain wall 104 and flows downward. Then, the liquid reaches the distal end of the drain wall 104 and falls from the distal end of the drain wall 104 onto the first inclined surface 68. The liquid that has fallen onto the first inclined surface 68 travels along the first inclined surface 68 and flows out to the communication hole 66. Due to this, the liquid is discharged to below the stand 32 via the communication hole 66 and the insertion hole 38. Consequently, pooling of the liquid between the cover 100 (the rotating body 43) and the motor base 48 above the support shaft 36 can be controlled.

Further, the drain wall 104 is formed in the shape of a tube along the peripheral edge of the open hole 102 and projects downward from the upper wall of the cover 100. Due to this, in a case where the liquid flows (ingresses) into the open hole 102, the liquid flows downward along the direction in which the drain wall 104 projects, so the liquid can be reliably caused to flow downward.

Moreover, the first inclined surface 68 is disposed on the upper edge portion of the communication hole 66 in the upper end cover portion 58, and the first inclined surface 68 is arranged in such a way as to be inclined inward in the radial direction of the communication hole 66 as it heads downward. Due to this, the liquid can be easily discharged to the communication hole 66 by a simple configuration.

Further, the outer peripheral surface of the drain wall 104 is arranged in such a way as to be inclined inward in the radial direction of the open hole 102 as it heads downward. For this reason, when the liquid that has traveled along the drain wall 104 and flowed downward has reached the distal end of the drain wall 104, the liquid can be suppressed from ingressing to the outer peripheral surface side of the drain wall 104. Further, supposing that the liquid has ingressed to the outer peripheral surface side of the drain wall 104 and adhered to the outer peripheral surface of the drain wall 104, the liquid adhering to the outer peripheral surface of the drain wall 104 travels along the outer peripheral surface of the drain wall 104 and flows downward. Then, the liquid reaches the distal end of the drain wall 104 and falls onto the first inclined surface 68. Due to this, the liquid that has travelled on the drain wall 104 can be reliably caused to fall onto the first inclined surface 68.

Moreover, the fitting wall 106 of the cover 100 projects downward from the cover 100 on the outside with respect to the drain wall 102 in the radial direction of the open hole 102 and is arranged above the upper end cover portion 58. Due to this, supposing that the liquid that has reached the distal end of the drain wall 104 has ingressed to the radial direction outside of the drain wall 104, the liquid can be blocked by the fitting wall 106 and caused to fall onto the upper wall 62 of the upper end cover portion 58.

Further, the first inclined surface 68 is arranged lower than the distal end of the fitting wall 106. For this reason, by causing the liquid that has fallen onto the upper wall 62 of the upper end cover portion 58 to be discharged from the first inclined surface 68 to the communication hole 66, the distal end of the fitting wall 106 can be suppressed from being immersed in the liquid that has fallen onto the upper end cover portion 58. Due to this, the liquid that has fallen onto the upper end cover portion 58 can be suppressed from traveling back to the fitting wall 106.

Moreover, the fitted wall 70 is disposed on the upper end cover portion 58. Further, the fitted wall 70 is fitted with the fitting wall 106 in a state in which the fitted wall 70 and the fitting wall 106 overlap in the radial direction of the fitting wall 106. Due to this, supposing that the liquid has ingressed into the space S of the fitting wall 106 from between the drain wall 104 and the first inclined surface 68, the ingress of the liquid into the cover 100 can be suppressed by the fitting wall 106 and the fitted wall 70.

Further, the smallest dimension G1 of the gap G between the distal end surface of the drain wall 104 and the first inclined surface 68 is set to 1 mm. Further, the motor base 48 is made of POM, and the cover 100 is made of PP. For this reason, when the liquid has traveled along the drain wall 104 and reached the distal end of the drain wall 104, capillary action (capillary phenomenon) can be suppressed from occurring. Due to this, the ingress, into the space S, of the liquid that has traveled along the drain wall 104 and reached the distal end of the drain wall 104 can be suppressed even more, so the liquid can be suppressed from pooling inside the space S.

Moreover, the ingress preventing wall 108 is disposed on the upper wall of the cover 100, and the ingress preventing wall 108 projects upward from the peripheral edge portion of the open hole 102. For this reason, the inflow, into the open hole 102, of the liquid adhering to the upper wall of the cover 100, for example, can be blocked by the ingress preventing wall 108, so the inflow (ingress), into the open hole 102, of the liquid that has ingressed into the door mirror device for a vehicle 10 can be suppressed.

Further, the gap dimension G2 between the fitting wall 106 and the distal end of the drain wall 104 is set to 1 mm. For this reason, the liquid that has traveled along the drain wall 104 and reached the distal end of the drain wall 104 can be suppressed from being lifted upward by surface tension between the drain wall 104 and the fitting wall 106. Due to this, the liquid that has traveled along the drain wall 104 and reached the distal end of the drain wall 104 can be even more reliably caused to fall onto the first inclined surface 68.

Moreover, in comparison to the differences between the smallest diameter dimension D1 of the insertion hole 38 and the respective diameter dimensions D2 and D3 of the communication hole 66 and the open hole 102 and the diameter dimension D4 of the harness 110, the dimension H in the up-and-down direction between the upper end (distal end) of the ingress preventing wall 108 and the lower end (distal end) of the drain wall 104 is set larger. For this reason, the liquid that has ingressed into the door mirror device for a vehicle 10 can be suppressed from ingressing into the open hole 102 from diagonally above the open hole 102. Due to this, the ingress, into the open hole 102, of the liquid that has ingressed into the door mirror device for a vehicle 10 can be suppressed even more.

Further, the smallest diameter dimension D1 of the insertion hole 38 and the respective diameter dimensions D2 and D3 of the communication hole 66 and the open hole 102 are set the same. Due to this, pooling of the liquid between the cover 100 and the motor base 48 can be suppressed while suppressing the impact on the insertionability of the harness 110 wired inside the insertion hole 38, the communication hole 66, and the open hole 102.

Second Embodiment

Figure 5:
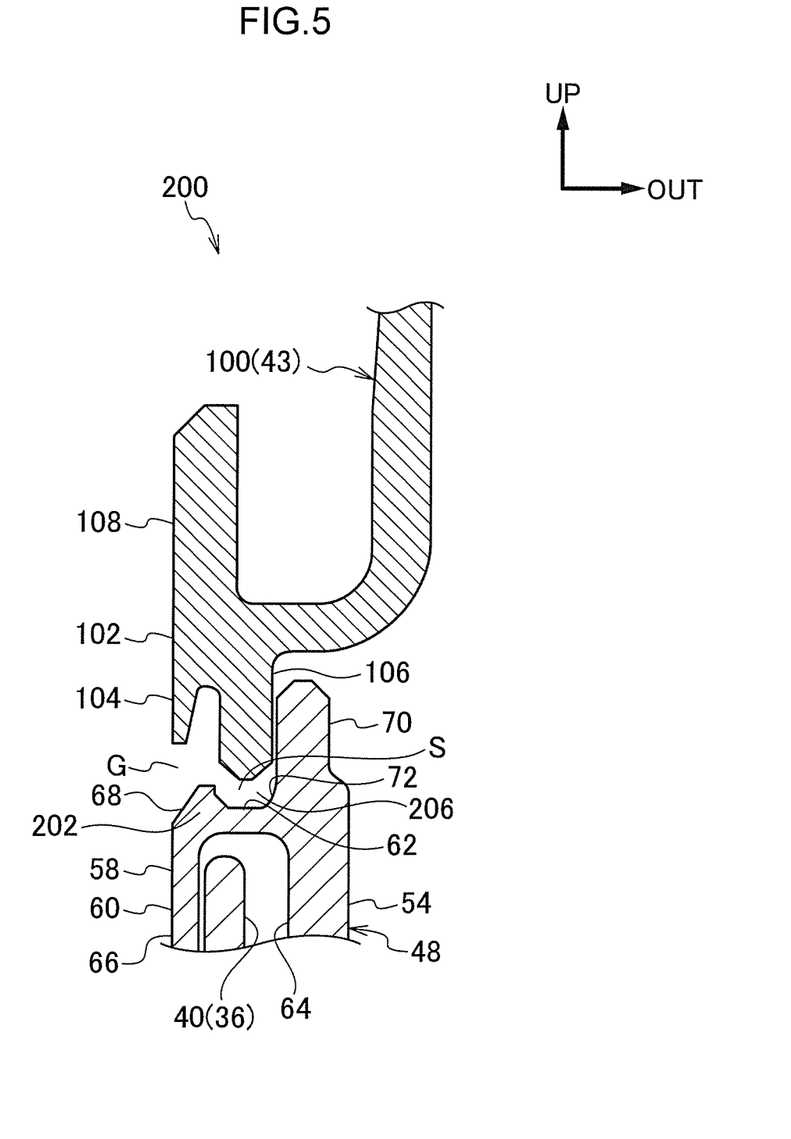
FIG. 5 is an enlarged longitudinal sectional view showing part of a storage mechanism used in a door mirror device for a vehicle pertaining to a second embodiment of the invention.

In FIG. 5, part of a storage mechanism 30 used in a door mirror device for a vehicle 200 pertaining to a second embodiment is shown in an enlarged longitudinal sectional view. The door mirror device for a vehicle 200 pertaining to the second embodiment has substantially the same configuration as that of the door mirror device for a vehicle 10 pertaining to the first embodiment but differs in the following respect.

As shown in FIG. 5, a cross-sectionally substantially trapezoidal convex portion 202 is disposed on the upper end cover portion 58 of the motor base 48 on the entire periphery of the upper edge portion of the communication hole 66. The convex portion 202 projects upward with respect to the upper wall 62, and the inner peripheral surface of the convex portion 202 is the first inclined surface 68. That is, the first inclined surface 68 in the second embodiment is arranged higher in comparison to the first inclined surface 68 of the first embodiment. Further, a base-side groove portion 206 is disposed between the convex portion 202 and the fitted wall 70 (at the outside of the first inclined surface 68 in the radial direction of the communication hole 66), and the base-side groove portion 206 is arranged directly below the fitting wall 106.

Here, in a case where the liquid that has ingressed into the door mirror device for a vehicle 200 flows into the open hole 102 in the cover 100, like in the first embodiment, the liquid travels along the drain wall 104 and flows downward. Then, the liquid reaches the distal end of the drain wall 104 and falls from the distal end of the drain wall 104 onto the first inclined surface 68. The liquid that has fallen onto the first inclined surface 68 travels along the first inclined surface 68 and flows out to the communication hole 66.

Further, supposing that the liquid that has reached the distal end of the drain wall 104 has ingressed to the radial direction outside of the drain wall 104, the liquid is blocked by the fitting wall 106 and falls into the base-side groove portion 206.

Moreover, the first inclined surface 68 is arranged lower than the distal end of the fitting wall 106, so the liquid that has fallen into the base-side groove portion 206 is discharged from the first inclined surface 68 to the communication hole 66, whereby the distal end of the fitting wall 106 can be suppressed from being immersed in the liquid that has fallen into the base-side groove portion 206. Due to this, the liquid that has fallen onto the upper end cover portion 58 can be suppressed from traveling back to the fitting wall 106.

Due to what has been described above, in the second embodiment also, the same operation and effects as in the first embodiment can be provided.

Further, in the second embodiment, the convex portion 202 is disposed on the upper end cover portion 58 of the motor base 48. For this reason, the thickness of the motor base 48 between the first inclined surface 68 and the groove portion 64 can be made thicker. Due to this, the first inclined surface 68 can be disposed on the upper end cover portion 58 while ensuring the strength of the upper end cover portion 58 of the motor base 48.

Third Embodiment

Figure 6:
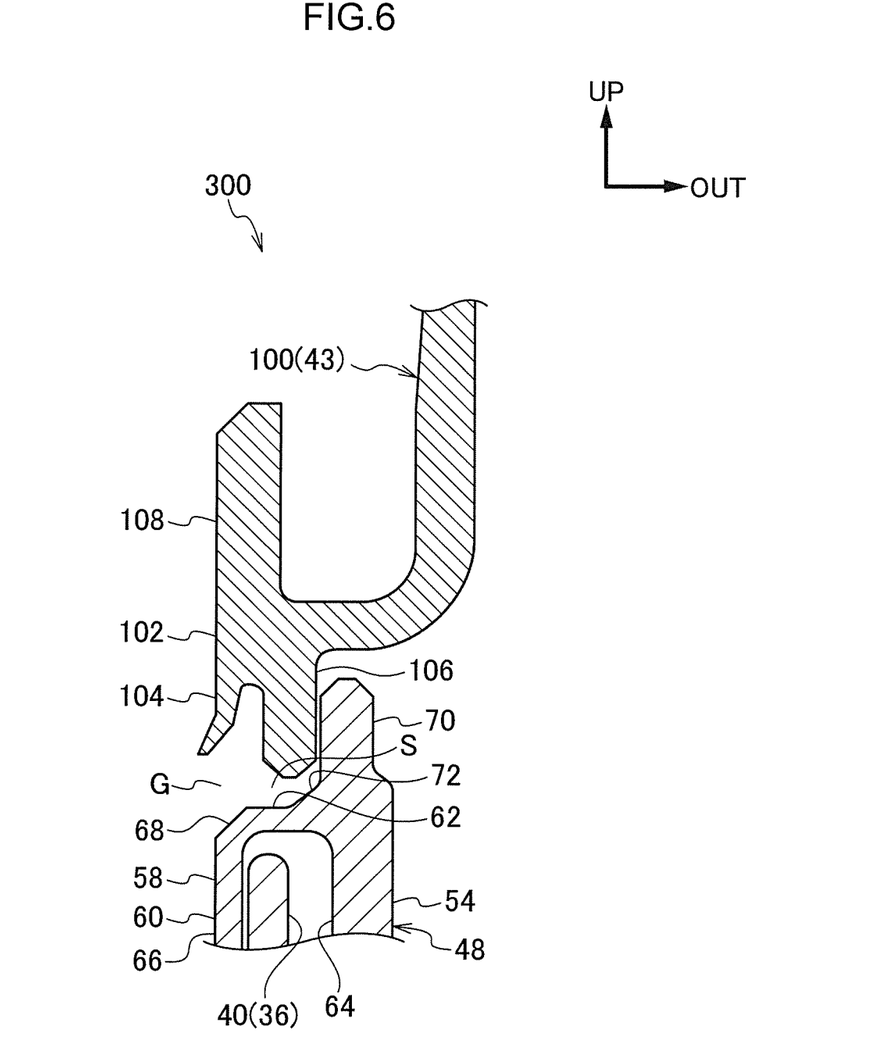
FIG. 6 is an enlarged longitudinal sectional view showing part of a storage mechanism used in a door mirror device for a vehicle pertaining to a third embodiment of the invention.

In FIG. 6, part of a storage mechanism 30 used in a door mirror device for a vehicle 300 pertaining to a third embodiment is shown in an enlarged longitudinal sectional view. The door mirror device for a vehicle 300 pertaining to the third embodiment has substantially the same configuration as that of the door mirror device for a vehicle 10 pertaining to the first embodiment but differs in the following respect.

As shown in FIG. 6, the distal end portion (lower end portion) of the drain wall 104 of the cover 100 is bent inward in the radial direction of the open hole 102. That is, as seen in a plan view, the distal end of the drain wall 104 is arranged on the inside in the radial direction of the communication hole 66 with respect to the inner peripheral surface of the communication hole 66.

Here, in a case where the liquid that has ingressed into the door mirror device for a vehicle 300 flows into the open hole 102 in the cover 100, the liquid travels along the drain wall 104 and flows downward. Then, the liquid reaches the distal end of the drain wall 104 and falls directly from the distal end of the drain wall 104 into the insertion hole 38. Due to this, the liquid that has traveled along the drain wall 104 and flowed down to the distal end of the drain wall 104 can be directly discharged to the insertion hole 38.

In the first embodiment and the second embodiment, the distal end of the drain wall 104 is arranged directly above the first inclined surface 68. Instead of this, the distal end of the drain wall 104 may be arranged on the inside in the radial direction of the communication hole 66 with respect to the first inclined surface 68. In this case, for example, the diameter dimension D3 of the open hole 102 may be made smaller in comparison to the diameter dimension D2 of the communication hole 66, and the distal end of the drain wall 104 may be arranged on the inside with respect to the first inclined surface 68 in the radial direction of the communication hole 66.

Further, in the first embodiment to the third embodiment, the outer peripheral surface of the drain wall 104 is arranged in such a way as to be inclined inward in the radial direction of the open hole 102 as it heads downward. Instead of this, the outer peripheral surface of the drain wall 104 may be arranged along the up-and-down direction.

Moreover, in the first embodiment to the third embodiment, the thickness dimension W of the distal end surface of the drain wall 104 is set to 0.8 mm, but the thickness dimension W can be arbitrarily set. In particular, by making the thickness dimension W smaller, it becomes easier to cause the liquid that has traveled along the drain wall 104 and reached the distal end of the drain wall 104 to fall onto the first inclined surface 68. Moreover, such distal end surface of the drain wall 104 may be omitted. That is, the lower end of the inner peripheral surface of the drain wall 104 and the lower end of the outer peripheral surface of the drain wall 104 may be connected.

Further, in the first embodiment to the third embodiment, the smallest dimension G1 of the gap G between the distal end surface of the drain wall 104 and the first inclined surface 68 is set to 1 mm, but the smallest dimension G1 of the gap G can also be arbitrarily set. That is, considering the materials of the cover 100 and the motor base 48, it suffices as long as the gap G in which no capillary action occurs is provided between the distal end surface of the drain wall 104 and the first inclined surface 68.

Moreover, in the first embodiment to the third embodiment, the gap dimension G2 between the fitting wall 106 and the distal end of the drain wall 104 is set to 1 mm, but the gap dimension G2 can be arbitrarily set. That is, it suffices as long as the gap dimension G2 that can suppress the upward lifting of the liquid by surface tension is set between the drain wall 104 and the fitting wall 106.

Further, in the first embodiment to the third embodiment, the drain wall 104 is formed in the shape of a cylinder, but the shape of the drain wall is not limited to this. For example, the cross section may be formed in the shape of a ring-like polygon.

What is claimed is:

1. A mirror device for a vehicle, comprising:
a support member that is configured to include a support shaft formed in a shape of a tube having an insertion hole thereinside, and that is coupled to a vehicle body;
a rotating body that is rotatably supported at the support shaft, that is configured to be integrally rotatable with an outer mirror of the vehicle by driving of a motor, and in which an open hole is provided above the insertion hole;

a holding member that is accommodated inside the rotating body together with the motor in a state in which the holding member holds the motor;

a guide portion that is provided at a peripheral edge of the open hole in the rotating body and that guides downward liquid that ingresses into the open hole; and a discharge portion that is provided at the holding member, that is disposed so as to be separated from and below the guide portion, and that causes the liquid which is guided downward by the guide portion to be discharged to the insertion hole.

2. The mirror device for a vehicle of claim 1, wherein:

an upper end cover portion is provided at the holding member, the upper end portion covering an upper end portion of the support shaft, and a communication hole that is in communication with the insertion hole being formed in the upper end cover portion;

the guide portion is formed in a shape of a tube along the peripheral edge of the open hole and projects downward from the rotating body; and the discharge portion is provided at an upper edge portion of the communication hole in the upper end cover portion and is disposed such that the discharge portion is inclined inward in a radial direction of the communication hole as the discharge portion heads downward.

3. The mirror device for a vehicle of claim 2, wherein an outer peripheral surface of the guide portion is disposed such that the outer peripheral surface is inclined inward in a radial direction of the open hole as the outer peripheral surface heads downward.

4. The mirror device for a vehicle of claim 2, wherein:

an outer tube portion is provided in a shape of a tube at the rotating body, the outer tube portion projecting downward from the rotating body at an outer side of the guide portion in a radial direction of the open hole, and being disposed above the upper end cover portion; and the discharge portion is disposed below a distal end of the outer tube portion.

5. The mirror device for a vehicle of claim 3, wherein an outer tube portion is provided in a shape of a tube at the rotating body, the outer tube portion projecting downward from the rotating body at an outer side of the guide portion in the radial direction of the open hole, and being disposed above the upper end cover portion, and the discharge portion is disposed below a distal end of the outer tube portion.

6. The mirror device for a vehicle of claim 4, wherein a fitted tube portion is provided in a shape of a tube at the upper end cover portion, the fitted tube portion projecting upward from the upper end cover portion at an outer side of the outer tube portion in a radial direction of the outer tube portion, and being fitted with an outer peripheral portion of the outer tube portion.

7. The mirror device for a vehicle of claim 5, wherein a fitted tube portion is provided in a shape of a tube at the upper end cover portion, the fitted tube portion projecting upward from the upper end cover portion at an outer side of the outer tube portion in a radial direction of the outer tube portion, and being fitted with an outer peripheral portion of the outer tube portion.

8. The mirror device for a vehicle of claim 2, wherein a distal end portion of the guide portion is bent such that a distal end portion of the guide portion is inclined inward in a radial direction of the open hole as the distal end portion of the guide portion heads downward.

9. The mirror device for a vehicle of claim 2, wherein an ingress prevention tube portion is provided in a shape of a tube at the rotating body, the ingress prevention tube portion projecting upward from the peripheral edge of the open hole.

10. The mirror device for a vehicle of claim 1, wherein a gap is formed between the guide portion and the discharge portion such that a capillary phenomenon does not occur.

11. The mirror device for a vehicle of claim 2, wherein a groove portion is formed at the upper end cover portion, the groove portion being disposed at an outer side of the discharge portion in the radial direction of the communication hole.

12. The mirror device for a vehicle of claim 4, wherein a groove portion is formed at the upper end cover portion, the groove portion being disposed at an outer side of the discharge portion in the radial direction of the communication hole and directly below the outer tube portion.

* * * * *